US007877466B2

(12) United States Patent  
Chandrasekaran

(10) Patent No.: US 7,877,466 B2
(45) Date of Patent: Jan. 25, 2011

(54) NETWORK TOPOLOGY BASED STORAGE ALLOCATION FOR VIRTUALIZATION

(75) Inventor: Varagur Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1781 days.

(21) Appl. No.: 11/034,295

(22) Filed: Jan. 11, 2005

(65) Prior Publication Data

US 2006/0155831 A1 Jul. 13, 2006

(51) Int. Cl.
*G06F 15/177* (2006.01)
(52) U.S. Cl. ...................................... 709/220
(58) Field of Classification Search ................ 709/220
See application file for complete search history.

(56) References Cited

U.S. PATENT DOCUMENTS

| 5,042,030 | A  | * | 8/1991  | Grima et al. ............... 370/358 |
| 6,370,605 | B1 | * | 4/2002  | Chong, Jr. .................... 710/33 |
| 6,819,654 | B2 | * | 11/2004 | Soloway et al. ............. 370/238 |
| 6,888,800 | B1 | * | 5/2005  | Johnson et al. ............. 370/247 |
| 7,069,468 | B1 | * | 6/2006  | Olson et al. .................... 714/7 |
| 7,127,633 | B1 | * | 10/2006 | Olson et al. .................... 714/4 |
| 2001/0056480 | A1 | * | 12/2001 | Taylor et al. ................ 709/219 |
| 2002/0107874 | A1 | * | 8/2002  | DeLorme et al. ........... 707/200 |
| 2002/0141333 | A1 | * | 10/2002 | Hooper, III ................. 370/224 |
| 2003/0195929 | A1 | * | 10/2003 | Franke et al. ............... 709/204 |
| 2004/0151188 | A1 | * | 8/2004  | Maveli et al. ............... 370/398 |
| 2005/0097290 | A1 | * | 5/2005  | Cochran et al. ............. 711/165 |
| 2005/0102549 | A1 | * | 5/2005  | Davies et al. .................. 714/4 |
| 2006/0026336 | A1 | * | 2/2006  | Matsushige et al. ......... 711/100 |
| 2006/0075161 | A1 | * | 4/2006  | Grijalva et al. ................ 710/52 |

OTHER PUBLICATIONS

Van Der Zweep et al., "IT Consolidation with Virtualization Pays big Dividends," Hewlett Packard, published Oct. 1, 2004, 4 pages.
Taneja Group Technology Analyst, "EMC Invista: The Power of Network-Based Virtualization," The Taneja Group, Inc. Hopkinton, MA, May 2005 14 pages.

* cited by examiner

*Primary Examiner*—Vivek Srivastava
*Assistant Examiner*—William J Goodchild
(74) *Attorney, Agent, or Firm*—Weaver Austin Villeneuve & Sampson LLP

(57) ABSTRACT

Methods and apparatus are provided for improving the configuration and allocation of storage resources in a fiber channel fabric. Network topology information and loop topology information is used to increase data availability and data access efficiency. For example, devices in different loops are selected for striping and devices connected to a host through different ports and switches are selected for mirroring. Link speed, quality of service, credits, and the availability of trunking links can also be considered.

27 Claims, 7 Drawing Sheets

NETWORK TOPOLOGY BASED STORAGE ALLOCATION FOR VIRTUALIZATION

BACKGROUND OF THE INVENTION

1. Field of the Invention

The present invention generally relates to storage area networks. More specifically, the present invention provides mechanisms for efficient and effectively configuring storage resources in a fibre channel fabric.

2. Description of Related Art

In many storage area networks, virtualization is provided at a host or at an endpoint. For endpoint virtualization, a storage device may have multiple disks that include redundancy, striping and mirroring features. A host writes data to a disk array and the disk array is responsible for managing redundancy features in a manner transparent to the host. In another example, hosts may be responsible for implementing virtualization. Instead of having an end device perform the redundancy operations, a host can elect to mirror and stripe data across a variety of storage devices in a storage area network.

With the emergence of intelligent storage area networks, applications such as volume management, virtualization, and remote replication are being moved to the network. In some examples, fibre channel switches in a storage area network perform functions associated with these applications in a manner transparent to the hosts and end devices. However, mechanisms for efficiently and effectively configuring and allocating storage resources are limited in network based virtualization systems.

It is therefore desirable to provide methods and apparatus for improving the allocation and configuration of storage resources in a network using virtualization.

SUMMARY OF THE INVENTION

Methods and apparatus are provided for improving the configuration and allocation of storage resources in a fibre channel fabric. Network topology information and loop topology information is used to increase data availability and data access efficiency. For example, devices in different loops are selected for striping and devices connected to a host through different ports and switches are selected for mirroring. Link speed, quality of service, credits, and the availability of trunking links can also be considered.

In one embodiment, a method for allocating storage resources in a storage area network is provided. A configuration request for storage resources is received. The configuration request is received at a network virtualization server in a fibre channel network having a plurality of loops each including a plurality of storage devices. Network topology information including loop topology information associated with the fibre channel network is analyzed. It is determined that a first storage device and a second storage device reside on different loops. Storage resources are configured to include the first storage device and the second storage device.

In another embodiment, a network virtualization server in a fibre channel network is provided. The fibre channel network has multiple loops each including multiple storage devices. The network virtualization server includes an interface and a processor. The interface is configured to receive a configuration request for storage resources. The processor is configured to analyze network topology information including loop topology information associated with the fibre channel network and configure storage resources to include a first storage device and a second storage device that reside on different loops.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Figure 1:
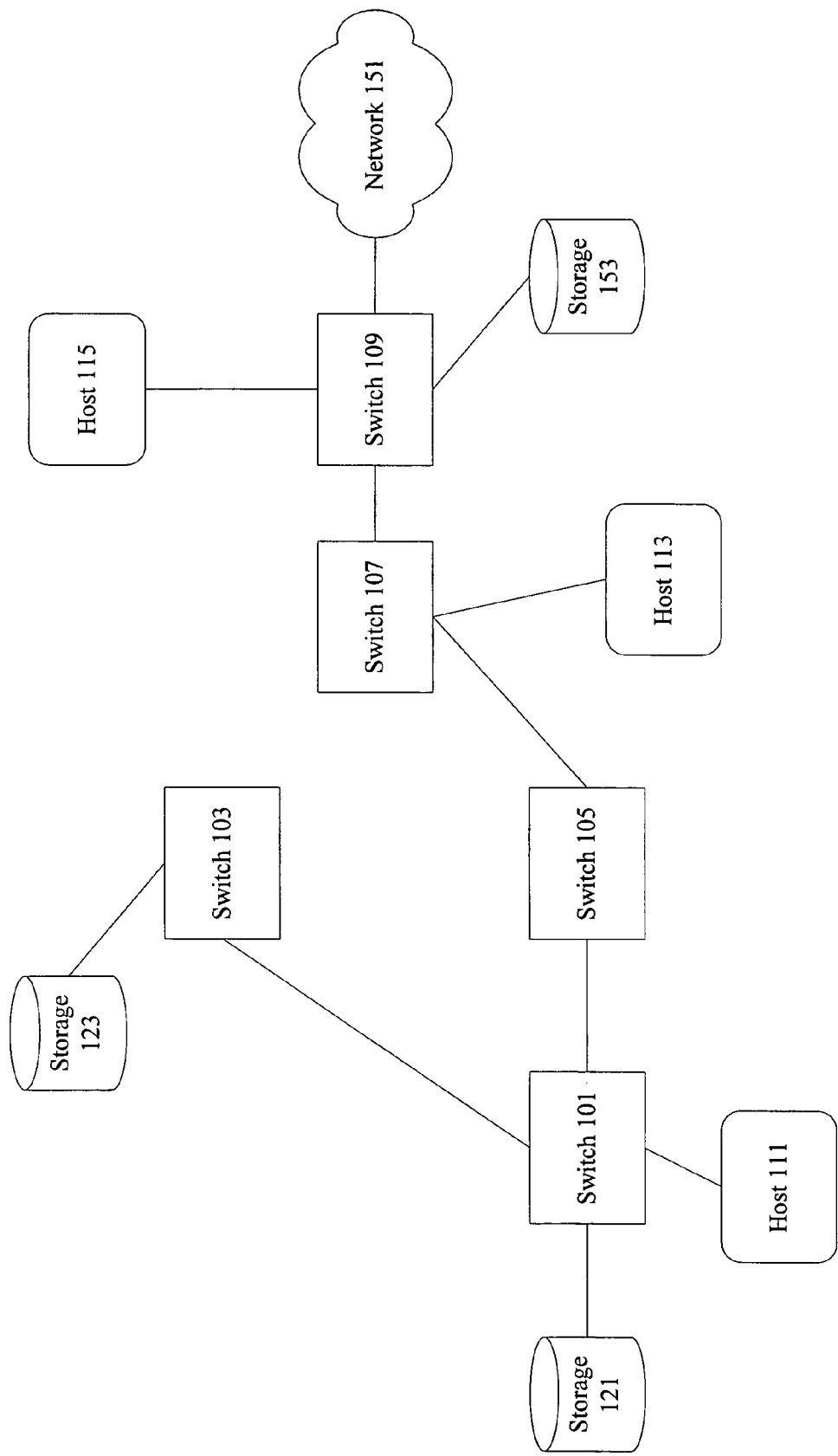
FIG. 1 is a diagrammatic representation showing a fibre channel network that can use the techniques of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Virtualization is an abstraction that allows efficient use of resources in a manner transparent to a user. In fibre channel networks, virtualization has conventionally been implemented at endpoints and at hosts. For example, a disk array would be responsible for striping and mirroring data across multiple disks. In another example, a host would provide for volume management.

Typical virtualization schemes such as those implemented at a host or an endpoint allows a controller to stripe and mirror data across multiple disks based on physical media characteristics such as disk speed and physical media size. In one example, two disks with similar performance characteristics can be selected for simultaneous writing or reading of data blocks. Data blocks A, B, C, and D can be striped across two disks to allow blocks A and C to be written to one disk while blocks B and D are simultaneously written to the other. However, typical virtualization schemes often select non-optimal disk resources for striping and mirroring.

For example, endpoint based virtualization schemes often select disks in the same fibre channel loop for mirroring and striping. A fibre channel loop topology involves an arbitration scheme where only one node can be active (i.e. either send or receive) at a given point in time (half-duplex). The half-duplex characteristics of fibre channel loop topologies minimize the advantages provided by striping data across disks. A second disk would have to wait for a first disk to write block A before the second disk can write block B. A link reset on a loop can also make all storage devices on the loop temporarily unavailable.

In one case, a huge array storage device could be connected via an F-port to a switch fabric, and all the associated LUNs/disk-units are chosen and carved out from within device itself as part of endpoint device-based virtualization. However, this has the same draw back of selecting disks from the same loop in terms of availability & redundancy (due to port-failure etc.) even though this configuration may not have half-duplex characteristics.

In another example, two disks in the same loop may be selected for mirroring. However, the two disks may be connected to the same fibre channel port. If the fibre channel port fails, data is no longer available despite minoring. Similarly, there may be disks in different loops that are connected to a host through a single switch. Redundancy may be ineffective if the switch fails.

A storage area network uses logical unit numbers (LUNs) to distinguish between storage resources. For example, users can determine whether a LUN is a disk drive, a number of disk drives, or a partition on a disk drive. Virtual logical unit numbers (VLUNs) allow more efficient organization of storage resources. Any set of resources used for storage in a storage area network is referred to herein as storage resources. According to various embodiments, storage resources include disk drives, portions or disk drives, or a partition of some physical storage media. In one example, storage resources are VLUNs. For example, a VLUN can be made up of complex Redundant Array of Independent Disks (RAID) layouts and even span across heterogeneous storage. VLUNs provide a convenient mechanism for more efficiently and intelligently allocating storage in order increase data availability and data access performance.

According to various embodiments, the virtual ports that expose the same LUN to host applications are controlled by a centralized entity in the fabric. Having a centralized entity provides consistency when the LUN is being accessed simultaneously by multiple hosts. Any mechanism that owns VLUNs is referred to herein as a VLUN server (VS). In many examples, a VS obtains network topology and loop topology information to intelligently configure VLUNs. Network topology information can be obtained manually or through an automatic fabric login or registration mechanisms. The VS serves VLUN configuration information to various clients, manages and allocates disk resources, creates/deletes/modifies VLUNs, and manages metadata on the disks in an intelligent manner that maximizes redundancy and data access efficiency. For example, disks for striping are selected from different fabric loops. Disks for mirroring are selected from resources connected through different switches and ports. Link speed, quality of service, credits, and the availability of trunking or interswitch links can also be considered.

FIG. 1 is a diagrammatic representation of one example of a network that can use the techniques of the present invention. FIG. 1 shows a storage area network implemented using fibre channel. A switch 101 is coupled to switches 103 and 105 as well as to a host 111 and storage 121. In one embodiment, host 111 is a server or client system while storage 121 is any storage subsystem such as a single disk or a redundant array of independent disks (RAID). Switch 105 is coupled to switch 107. Switch 107 is connected to host 113 and switch 103 is connected to storage resource 123. Switch 109 is connected to host 115, switch 107, storage resource 153, and an external network 151 that may or may not use fibre channel. In order for a host 111 to access network 151, a path going through switch 105 can be used. It should be noted that any apparatus including a processor, memory, and a connection to a fibre channel fabric can be referred to as a fibre channel switch.

Ports used to connect switches to each other in a fibre channel network are referred to herein as non fabric-port. Non fabric-ports include interswitch ports (E-ports). Ports used to connect a switch to a host are referred to herein as fabric-ports (F-ports). In one example, E-ports are used to connect switch 105 to switch 107 while F-ports are used to connect switch 107 to host 113. Similarly, fabric loop-ports (FL-ports) are used to connect switch 103 to storage resource 123.

According to various embodiments, a packet transmitted from host 111 to a network 151 or to storage resource 153 includes parameters such as the exchange identifier, a sequence, and a sequence number. The exchange identifier can provide information on what exchange the packet belongs to. The sequence can provide information on what portion of the exchange the packet belongs to while the sequence number can provide information on how the packets should be ordered. Sequence numbers can be used to allow for in order delivery of fibre channel packets.

Storage resources 123 and 153 may be fabric loops coupled respectively to switches 103 and 109 through FL-ports. The fabric loops typically include multiple storage devices. Any mechanism for connecting multiple storage devices that allows only access to a subset of devices at any point in time. In one example, a loop is a Small Computer Systems Interface (SCSI) loop that allows connection of 8 or 16 devices in a half-duplex framework.

Figure 2:
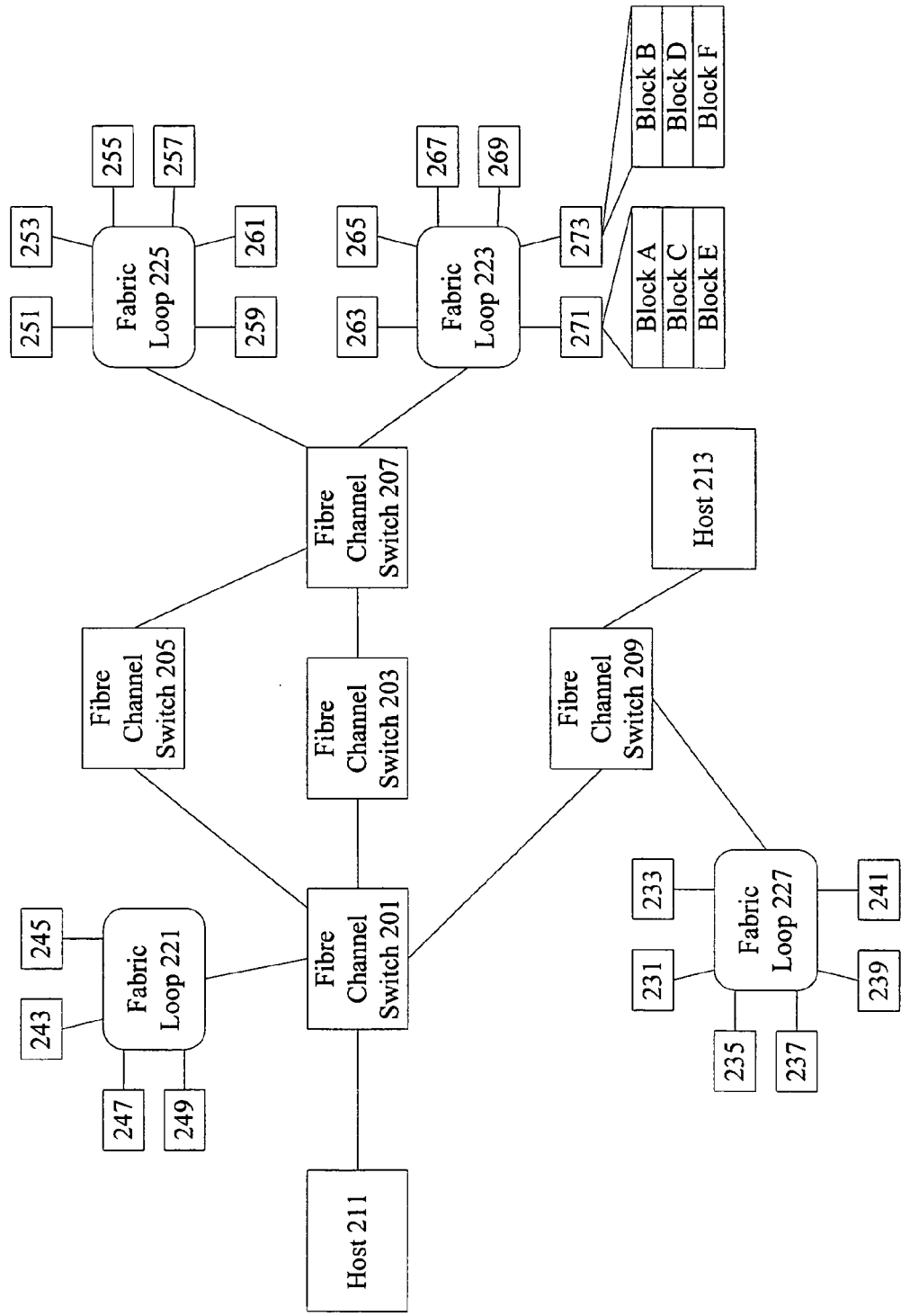
FIG. 2 is a diagrammatic representation showing striping using host based and endpoint based virtualization.

FIG. 2 is a diagrammatic representation showing striping across multiple disks. A fibre channel network includes fibre channel switches 201, 203, 205, 207, and 209. Switch 201 is coupled to host 211 through an F-port and fabric loop 221 through an FL-port. The fabric loop 211 includes storage devices 243, 245, 247, and 249. Switch 205 is coupled to switches 201 and 207 through E-ports. Switch 203 is coupled to switches 201 and 207 through E-ports. Switch 209 is coupled to host 213 through an F-port and to fabric loop 227 through an FL-port. Fabric loop 227 includes storage devices 231, 233, 235, 237, 239, and 241. Switch 207 is coupled to fabric loops 225 and 223 through FL-ports. Fabric loop 225 includes storage devices 251, 253, 255, 257, 259, and 261. Fabric loop 223 includes storage devices 263, 265, 267, 269, 271, and 273.

According to various embodiments, striping is provided through endpoint based virtualization by a controller associated with fabric loop 223. In one example, a host 211 is configured to write a VLUN through a controller associated with the fabric loop 223. The controller then stripes the data across two disks 271 and 273 to allow simultaneous access. In this example, data blocks A, B, C, D, E, and F are written as blocks A, C, and E to disk 271 and as block B, D, and F to disk 273.

The host 211 believes that it is writing to a single disk. However, the controller at the fabric loop 223 transparently stripes the data across multiple disks. In another example, a host may have selected disks 271 and 273 for striping based on the disk speed characteristics of disks 271 and 273. In yet another example, network based virtualization may have selected disks 271 and 273. However, selecting disks 271 and 273 is nonoptimal, as the fabric loop 223 only allows access to one device at any given time. Consequently, striping does not improve disk access speeds and in fact may worsen access times.

Figure 3:
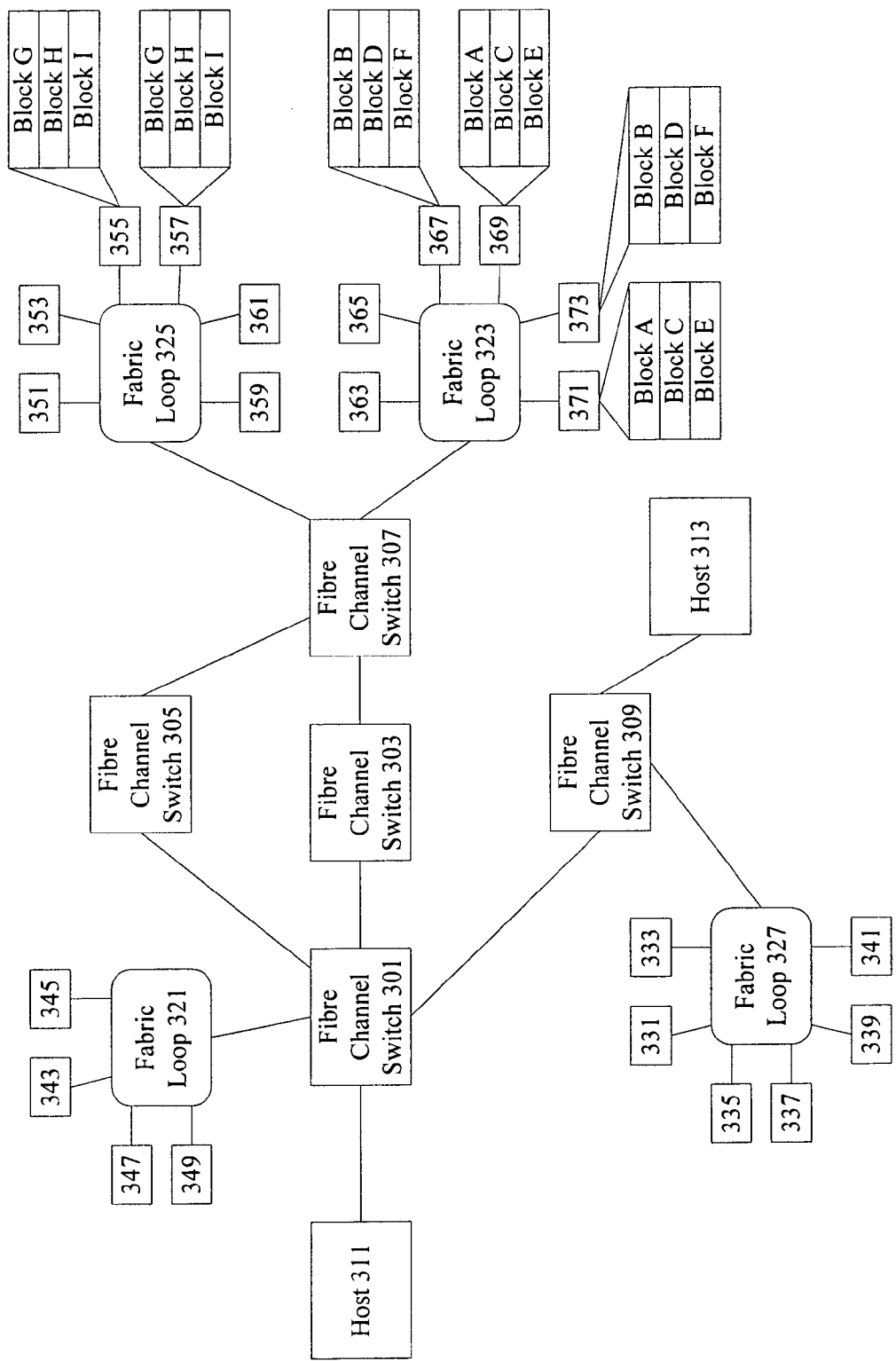
FIG. 3 is a diagrammatic representation showing mirroring and striping using host based and endpoint based virtualization.

FIG. 3 is a diagrammatic representation showing striping across multiple disks. A fibre channel network includes fibre channel switches 301, 303, 305, 307, and 309. Switch 301 is coupled to host 311 through an F-port and fabric loop 321 through an FL-port. The fabric loop 311 includes storage devices 343, 345, 347, and 349. Switch 305 is coupled to switches 301 and 307 through E-ports. Switch 303 is coupled to switches 301 and 307 through E-ports. Switch 309 is coupled to host 313 through an F-port and to fabric loop 327 through an FL-port. Fabric loop 327 includes storage devices 331, 333, 335, 337, 339, and 341. Switch 307 is coupled to fabric loops 325 and 323 through FL-ports. Fabric loop 325 includes storage devices 351, 353, 355, 357, 359, and 361. Fabric loop 323 includes storage devices 363, 365, 367, 369, 371, and 373.

According to various embodiments, mirroring is provided through endpoint based virtualization by a controller associated with fabric loop 325 and a combined mirroring and striping scheme is provided by a controller associated with fabric loop 323. In one example, a host 311 is configured to write a VLUN through a controller associated with the fabric loop 325. The controller then mirrors the data across two disks 355 and 357. In this example, data blocks G, H, and I are written to two separate disks so that the data will still be available if one of the disks fail.

The host 311 believes that it is writing to a single disk. However, the controller at the fabric loop 325 transparently mirrors the data across multiple disks. In another example, a host may have selected disks 355 and 357 for mirroring based on the disk speed characteristics of disks 355 and 357. In yet another example, network based virtualization may have selected disks 355 and 357. However, selecting disks 355 and 357 is nonoptimal, as the fabric loop 325 only allows access to one device at any given time. Furthermore, if a fibre channel switch 307 fails or the FL-port to fabric loop 325 fails, both disks 355 and 357 are no longer accessible. Consequently, points of failure remain despite data being redundantly written to both disks.

Fabric loop 323 provides both mirroring and striping. Blocks A, C, and E are mirrored onto disks 371 and 369 and blocks B, D, and F are mirrored onto disks 373 and 367. However, because disks 367, 369, 371, and 373 all reside on a single loop, only a single disk can be accessed at any given time. Furthermore, failure of a fibre channel switch 307 or failure of a port associated with switch 307 prevents access to data.

Figure 4:
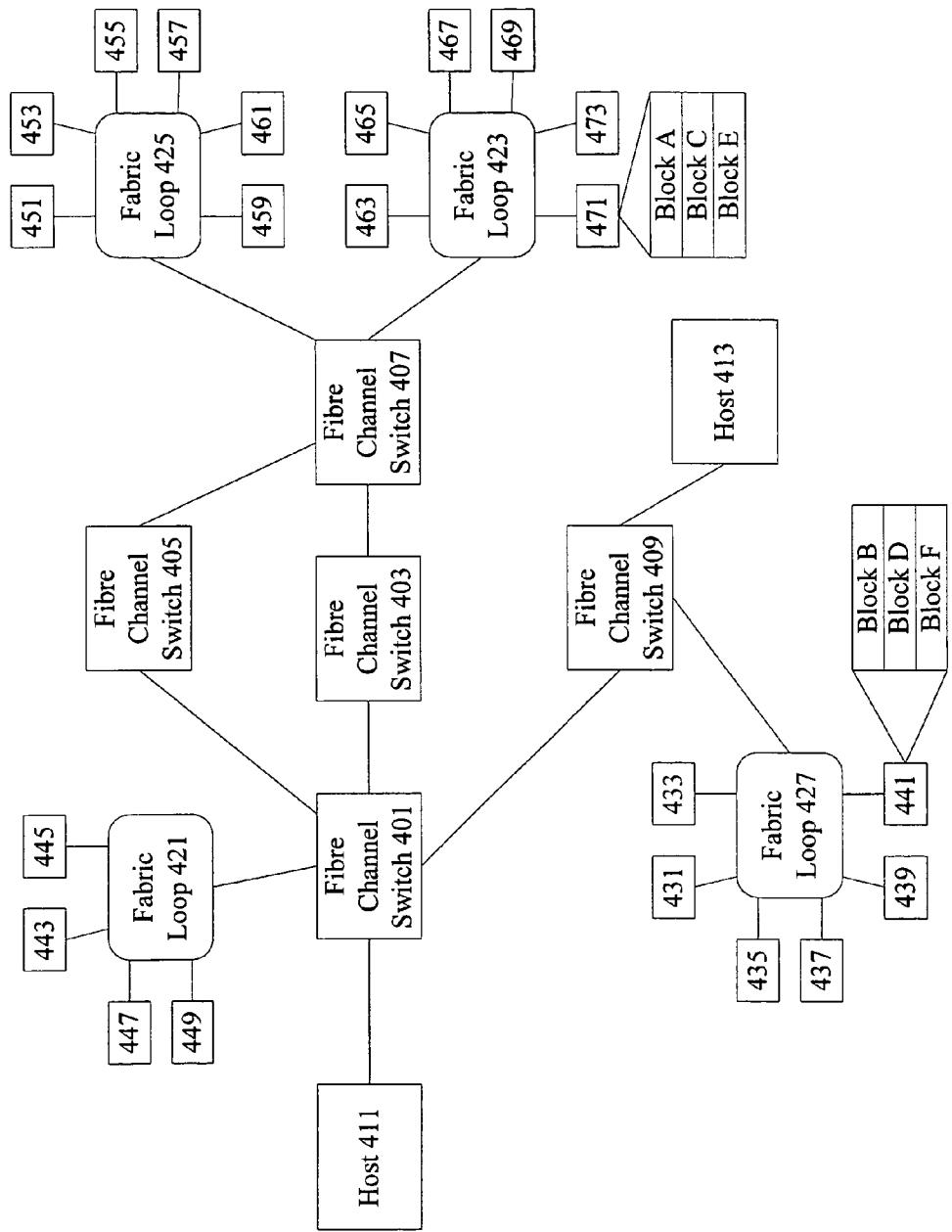
FIG. 4 is a diagrammatic representation showing striping using network topology based virtualization.

FIG. 4 is a diagrammatic representation showing intelligent allocation and configuration of storage resources for striping. A fibre channel network includes fibre channel switches 401, 403, 405, 407, and 409. Switch 401 is coupled to host 411 through an F-port and fabric loop 421 through an FL-port. The fabric loop 411 includes storage devices 443, 445, 447, and 449. Switch 405 is coupled to switches 401 and 407 through E-ports. Switch 403 is coupled to switches 401 and 407 through E-ports. Switch 409 is coupled to host 413 through an F-port and to fabric loop 427 through an FL-port. Fabric loop 427 includes storage devices 431, 433, 435, 437, 439, and 441. Switch 407 is coupled to fabric loops 425 and 423 through FL-ports. Fabric loop 425 includes storage devices 451, 453, 455, 457, 459, and 461. Fabric loop 423 includes storage devices 463, 465, 467, 469, 471, and 473.

According to various embodiments, striping is provided using network based virtualization. It should be noted that striping in this manner can also be provided using host based virtualization. In one example, a switch 401 operates as a VS and has allocated resources and configured VLUNs efficiently based on network topology and loop topology information. Physical media characteristics can also be considered. According to various embodiments, striping is performed across disks 471 and 441 that reside on loops 423 and 427 respectfully. In this example, data blocks A, B, C, D, E, and F are written as blocks A, C, and E to disk 471 and as blocks B, D, and F to disk 441.

The host 411 believes that it is writing to a single disk. However, VS transparently stripes the data across multiple disks in different loops. Consequently, the data can be written and read at the same time, particularly if quality of service and link speed to loops 423 and 427 is the same. Selecting disks 471 and 441 provides a more optimal way to stripe data and can improve data access speeds.

Figure 5:
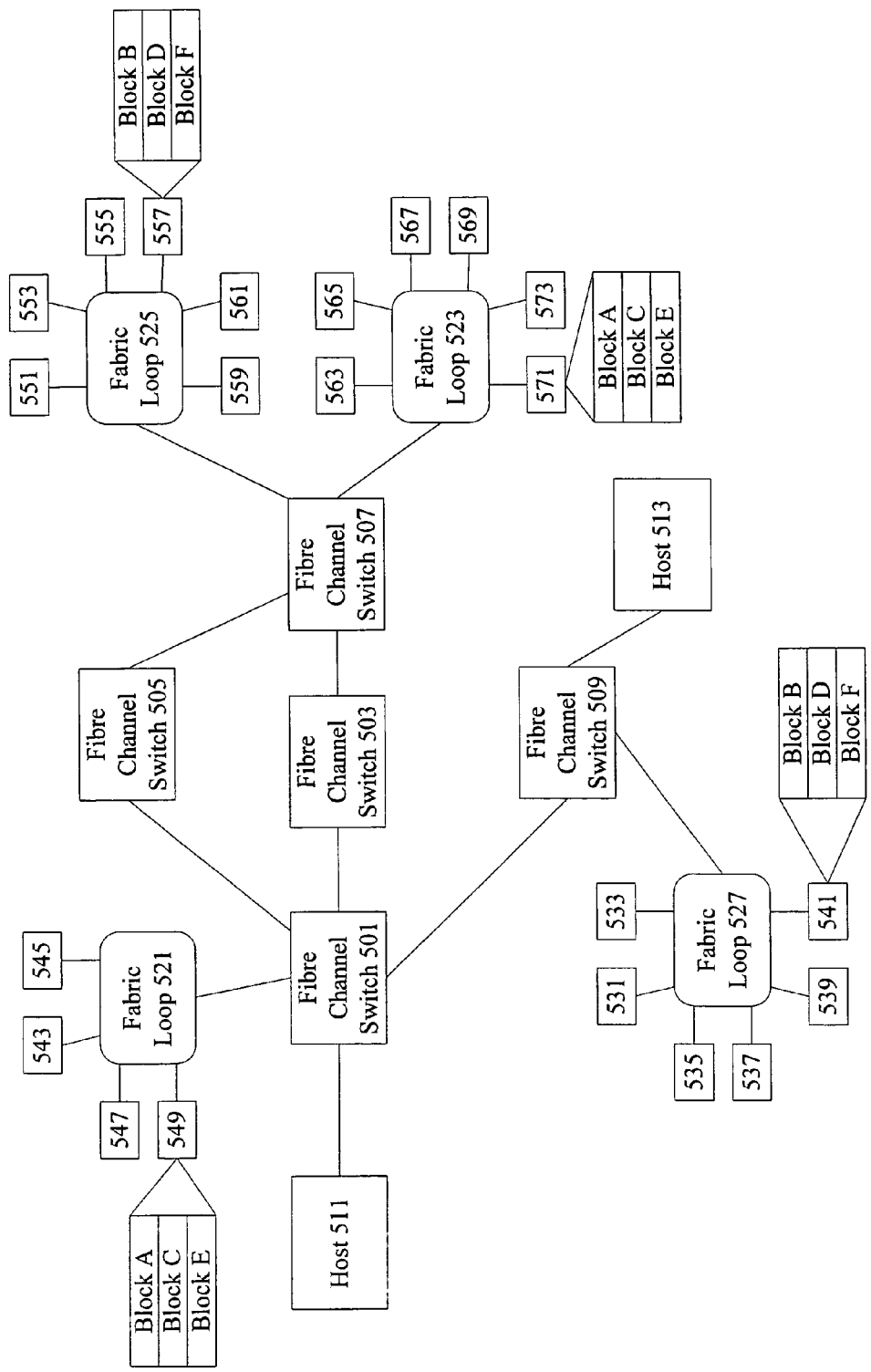
FIG. 5 is a diagrammatic representation showing mirroring using network topology based virtualization.

FIG. 5 is a diagrammatic representation showing intelligent allocation and configuration of storage resources for striping and mirroring. A fibre channel network includes fibre channel switches 501, 503, 505, 507, and 509. Switch 501 is coupled to host 511 through an E-port and fabric loop 521 through an FL-port. The fabric loop 511 includes storage devices 543, 545, 547, and 549. Switch 505 is coupled to switches 501 and 507 through E-ports. Switch 503 is coupled to switches 501 and 507 through E-ports. Switch 509 is coupled to host 513 through an E-port and to fabric loop 527 through an FL-port. Fabric loop 527 includes storage devices 531, 533, 535, 537, 539, and 541. Switch 507 is coupled to fabric loops 525 and 523 through FL-ports. Fabric loop 525 includes storage devices 551, 553, 555, 557, 559, and 561. Fabric loop 523 includes storage devices 563, 565, 567, 569, 571, and 573.

According to various embodiments, mirroring and striping is provided using network based virtualization. It should be noted that minoring and striping in this manner can also be provided using host based virtualization. In one example, a switch 501 operates as a VS and has allocated resources and configured VLUNs efficiently based on network topology and loop topology information. Physical media characteristics can also be considered. According to various embodiments, mirroring is performed across disks 571 and 549 as well as across disks 557 and 541. Striping is performed across disks 571 and 541 that reside on loops 523 and 527 respectfully. In this example, data blocks A, B, C, D, E, and F are written as blocks A, C, and E to disks 571 and 549 and as blocks B, D, and F to disk 541 and 557.

According to various embodiments, the host 511 believes that it is writing to a single disk. However, network virtualization transparently stripes and minors the data across multiple disks in different loops reachable through different ports and switches. Consequently, the data can be written and read at the same time, particularly if quality of service and link speed to various loops is the same. Furthermore, high availability is improved as redundancy is provided across different switches and ports. For example, failure of any individual fibre channel switch 503, 505, 507, or 509 does not prevent access to any of blocks A, B, C, D, E, or F. For example, if switches 503 or 505 (switches with trunking links or inter-switch links) fail, switch 507 can still be accessed. If switch 507 fails, the data can be accessed through switches 501 and 509. If switch 509 fails, the data can be accessed through switch 507 and loop 525. Availability of data is significantly increased. Performance is also significantly improved.

Figure 6:
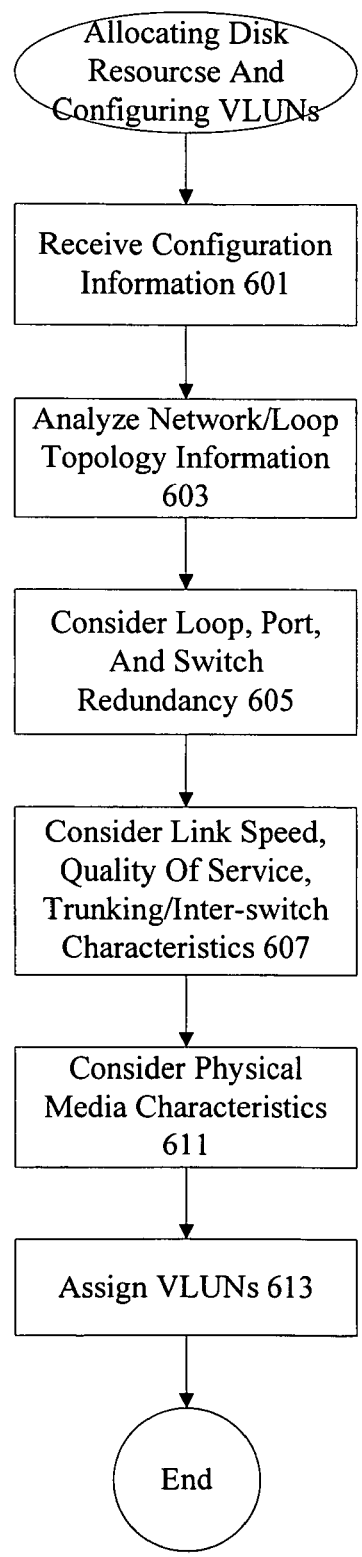
FIG. 6 is a flow process diagram showing a technique for allocating and configuring virtual logic unit numbers (VLUNs).

FIG. 6 is a flow process diagram showing one technique for allocating resources and configuring a VLUN. At 601, configuration information is received. Configuration information may be received from a host or a particular user. A request may include configuration parameters for a four-way striped two-way mirrored VLUN. Alternatively, the configuration parameters may call for a two-way striped three-way mirrored VLUN. At 603, network and loop topology information is analyzed. Network and loop apology information may be manually configured at a virtualization server. The virtualization server may be provided network topology and loop topology information by a system administrator.

The information can also be provided automatically through registration and fabric login processes. Network topology information can also be provided through a name server. At 605, loop, port, and switch redundancy is considered. According to various embodiments, disk resources are selected from different loops, different ports, and different switches were possible. At 607, factors such as link speed quality of service credits, and the availability of trunking and inter-switch links are also considered. According to various embodiments, disks with similar access times from a host to endpoint perspective are selected for mirroring and striping. Disks available through multiple path are also preferred. At 611, conventional characteristics such as disk speed and physical media sizes are also considered. According to various embodiments, disks for mirroring should be accessible through entirely different sets of resources. Disks for striping should allow as similar read and write access times and throughput speeds as possible. At 613, the VLUN mapping information is assigned.

Figure 7:
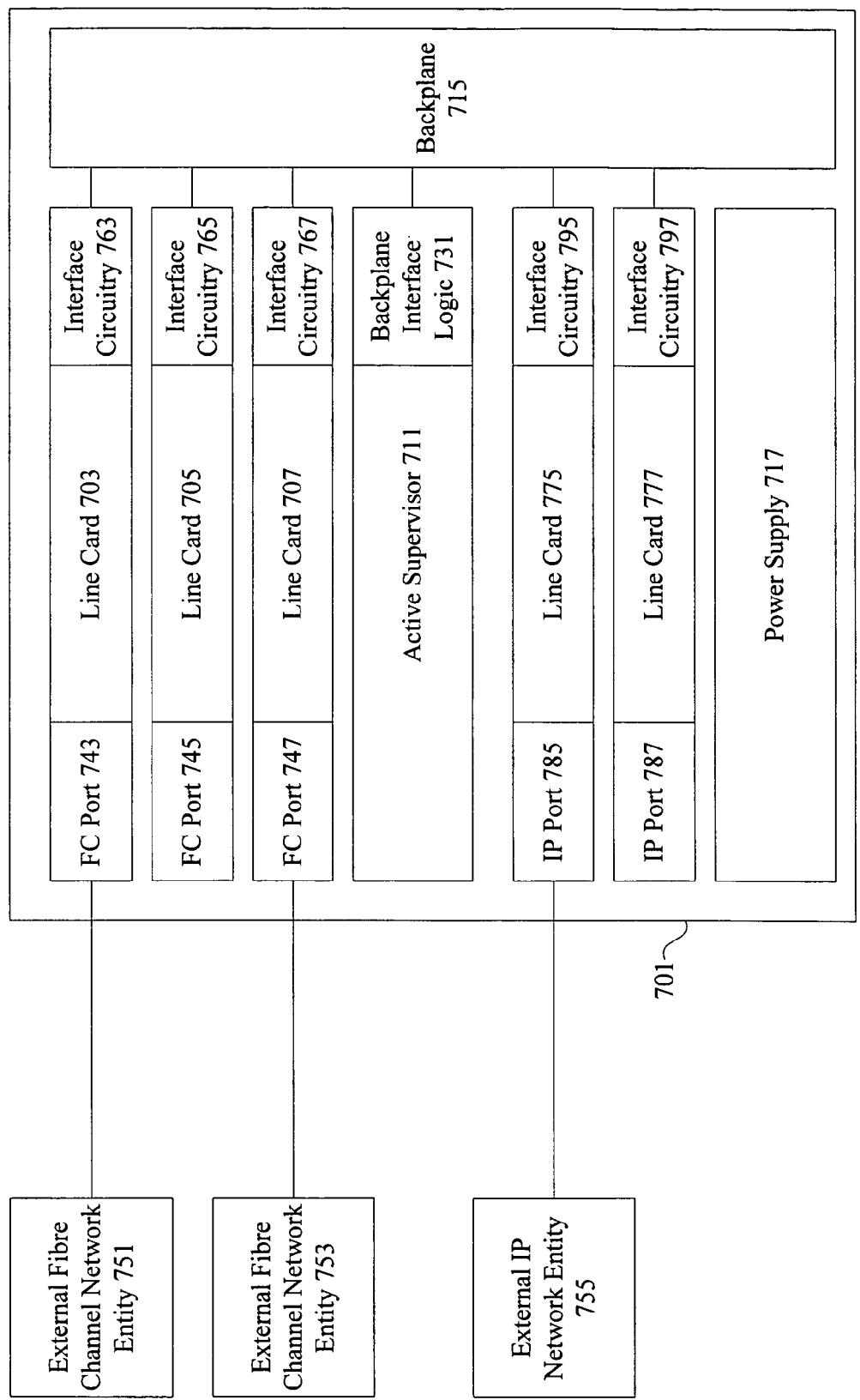
FIG. 7 is a diagrammatic representation showing a fibre channel switch.

FIG. 7 is a diagrammatic representation of one example of a fibre channel switch that can be used to implement techniques of the present invention. Although one particular configuration will be described, it should be noted that a wide variety of switch and router configurations are available. The tunneling switch 701 may include one or more supervisors 711. According to various embodiments, the supervisor 711 has its own processor, memory, and storage resources.

Line cards 703, 705, and 707 can communicate with an active supervisor 711 through interface circuitry 763, 765, and 767 and the backplane 715. According to various embodiments, each line card includes a plurality of ports that can act as either input ports or output ports for communication with external fibre channel network entities 751 and 753. The backplane 715 can provide a communications channel for all traffic between line cards and supervisors. Individual line cards 703 and 707 can also be coupled to external fibre channel network entities 751 and 753 through fibre channel ports 743 and 747.

External fibre channel network entities 751 and 753 can be nodes such as other fibre channel switches, disks, RAIDS, tape libraries, or servers. The fibre channel switch can also include line cards 775 and 777 with IP ports 785 and 787. In one example, IP port 785 is coupled to an external IP network entity 755. The line cards 775 and 777 also have interfaces 795 and 797 to the backplane 715.

It should be noted that the switch can support any number of line cards and supervisors. In the embodiment shown, only a single supervisor is connected to the backplane 715 and the single supervisor communicates with many different line cards. The active supervisor 711 may be configured or designed to run a plurality of applications such as routing, domain manager, system manager, and utility applications.

According to one embodiment, the routing application is configured to provide credits to a sender upon recognizing that a packet has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for allocating storage resources in a storage area network, the method comprising:
receiving a configuration request from a host for storage resources, the configuration request received at a network virtualization server in a fibre channel network having a plurality of loops each including a plurality of storage devices;
analyzing network topology information including loop topology information associated with the fibre channel network and access times from the host to the plurality of storage devices;
determining that a first storage device and a second storage device reside on different loops and have similar access times from the host, the first storage device residing in a first fabric loop including a plurality of first fabric loop storage devices, the first fabric loop configured to allow access to only one first fabric loop storage device at a given time; and
configuring storage resources to include the first storage device and the second storage device upon determining that the first storage device and the second storage device reside on different loops and have similar access times from the host.

2. The method of claim 1, wherein storage resources comprises a virtual logical unit number (VLUN).

3. The method of claim 2, further comprising determining that a third storage device resides on yet another loop.

4. The method of claim 3, wherein storage resources are further configured to include the third storage device.

5. The method of claim 1, wherein data is striped across the first storage device and the second storage device in different loops.

6. The method of claim 5, wherein striping data across different loops allows data to be simultaneously written on the first storage device and the second storage device.

7. The method of claim 1, wherein the plurality of storage devices in each of the plurality of loops involves an arbitration scheme where only one node can be active at a given point in time.

8. The method of claim 7, wherein the arbitration scheme is a half-duplex arbitration scheme.

9. The method of claim 1, wherein data is mirrored across the first storage device and the second storage device in different loops.

10. The method of claim 1, wherein the configuration request is received from a user.

11. The method of claim 1, wherein the first storage device resides in a first loop coupled to a first switch and the second storage device resides in a second loop coupled to a second switch.

12. The method of claim 1, wherein network topology information includes link speed to the plurality of loops.

13. The method of claim 1, wherein network topology information includes the availability of loops behind trunking or inter-switch links.

14. The method of claim 1, wherein network topology information includes the availability of credits to different loops.

15. The method of claim 1, wherein network topology information includes availability of credits to the plurality of loops.

16. A server, the server comprising:
an interface configured to receive a configuration request from a host for storage resources;
a processor configured to analyze network topology information including loop topology information associated with the fibre channel network and access times from the host to a plurality of storage devices in a plurality of loops, the processor further operable to configure storage resources to include a first storage device and a second storage device that reside on different loops upon determining that the first storage device and the second storage device have similar access times from the host, the first storage device residing in a first fabric loop including a plurality of first fabric loop storage devices, the first fabric loop configured to allow access to only one first fabric loop storage device at a given time.

17. The network virtualization server of claim 16, wherein storage resources comprises a virtual logical unit number (VLUN).

18. The network virtualization server of claim 17, further comprising determining that a third storage device resides on yet another loop.

19. The network virtualization server of claim 18, wherein storage resources are further configured to include the third storage device.

20. The network virtualization server of claim 16, wherein data is striped across the first storage device and the second storage device in different loops.

21. The network virtualization server of claim 20, wherein striping data across different loops allows data to be simultaneously written on the first storage device and the second storage device.

22. The network virtualization server of claim 16, wherein data is mirrored across the first storage device and the second storage device in different loops.

23. A system for allocating storage resources, the system comprising:
means for receiving a configuration request from a host for storage resources, the configuration request received at a network virtualization server in a fibre channel network having a plurality of loops each including a plurality of storage devices;
means for analyzing network topology information including loop topology information associated with the fibre channel network and access times from the host to the plurality of storage devices;
means for determining that a first storage device and a second storage device reside on different loops and have similar access times from the host, the first storage device residing in a first fabric loop including a plurality of first fabric loop storage devices, the first fabric loop configured to allow access to only one first fabric loop storage device at a given time; and
means for configuring storage resources to include the first storage device and the second storage device upon determining that the first storage device and the second storage device reside on different loops and have similar access times from the host.

24. The system of claim 23, wherein storage resources comprises a virtual logical unit number (VLUN).

25. The system of claim 24, further comprising means for determining that a third storage device resides on yet another loop.

26. The system of claim 25, wherein storage resources are further configured to include the third storage device.

27. The system of claim 23, wherein data is striped across the first storage device and the second storage device in different loops.

* * * * *